(12) United States Patent
Hosoi

(10) Patent No.: US 6,888,985 B2
(45) Date of Patent: May 3, 2005

(54) ARRAYED WAVEGUIDE GRATING AND OPTICAL COMMUNICATION SYSTEM USING ARRAYED WAVEGUIDE GRATING

(75) Inventor: Toru Hosoi, Tokyo (JP)

(73) Assignee: NEC Corporation, Tokyo (JP)

( * ) Notice: Subject to any disclaimer, the term of this patent is extended or adjusted under 35 U.S.C. 154(b) by 0 days.

(21) Appl. No.: 09/892,500

(22) Filed: Jun. 28, 2001

(65) Prior Publication Data

US 2002/0001433 A1 Jan. 3, 2002

(30) Foreign Application Priority Data

Jun. 29, 2000 (JP) ........................................ 2000-195858

(51) Int. Cl.$^7$ .............................. G02B 6/34; G02B 6/26
(52) U.S. Cl. .............................. 385/37; 385/46; 385/24; 398/84
(58) Field of Search .............................. 385/46, 37, 24; 359/84

(56) References Cited

U.S. PATENT DOCUMENTS

| | | | | |
|---|---|---|---|---|
| 5,002,350 A | * | 3/1991 | Dragone | ...................... 359/124 |
| 5,179,605 A | * | 1/1993 | Kaverhad et al. | ............. 385/37 |
| 6,069,990 A | * | 5/2000 | Okawa et al. | ................. 385/43 |
| 6,188,818 B1 | * | 2/2001 | Han et al. | ..................... 385/24 |

FOREIGN PATENT DOCUMENTS

| | | | | |
|---|---|---|---|---|
| GB | 2 349 957 A | | 11/2000 | |
| JP | 09-297228 | * | 5/1996 | ............ G02B/6/12 |
| JP | 10-197735 | | 7/1998 | |
| JP | 11-133253 | | 5/1999 | |
| JP | 11-174252 | | 7/1999 | |
| JP | 2000-258647 | | 9/2000 | |

OTHER PUBLICATIONS

Okamoto, K. and Sugita, A. "Flat spectral response arrayed--waveguide grating multiplexer with parabolic waveguide horns" Electronics Letters, Aug. 29, 1996, vol. 32 No. 18, pp 1661–1662.*
United Kingdom Search Report dated Dec. 18, 2002.
Japanese Office Action dated Jan. 21, 2003 and partial English translation.
United Kingdom Office Action dated Dec. 3, 2001, incorporating a United Kingdom Combined Search and Examination Report dated Dec. 3, 2001.
European Search Report dated Jul. 25, 2002.
European Search Report dated Jul. 25, 2002 (Documents considered to be relevant: None).
The document has been considered, but will not be printed.

* cited by examiner

*Primary Examiner*—Edward J. Glick
*Assistant Examiner*—Krystyna Suchecki
(74) *Attorney, Agent, or Firm*—McGinn & Gibb, PLLC

(57) ABSTRACT

An arrayed waveguide element having flat optical frequency characteristics, and an optical communication system using such arrayed waveguide element are realized by providing the arrayed waveguide element that is prepared by forming an inputting channel waveguide as well as an outputting channel waveguide, a channel waveguide array, a first sector form slab waveguide for connecting the inputting channel waveguide with the channel waveguide array, and a second sector form slab waveguide for connecting the outputting channel waveguide with the channel waveguide array on a substrate. A waveguide part wherein the outputting channel waveguide is connected with the second sector form slab waveguide is defined in a parabolic configuration, whereby flat optical frequency characteristics are realized. Furthermore, it is possible that an individual parabolic configuration is adjusted in response to a wavelength, so that it can cope with a trend of broad band in optical signals.

23 Claims, 12 Drawing Sheets

ARRAYED WAVEGUIDE GRATING AND OPTICAL COMMUNICATION SYSTEM USING ARRAYED WAVEGUIDE GRATING

FIELD OF THE INVENTION

The present invention relates to an arrayed waveguide grating and an optical communication system using such an arrayed waveguide grating, and particularly to an arrayed waveguide grating used as an optical wavelength multiplexing-demultiplexing element and an optical communication system of a wavelength division multiplexing transmission type using such an optical wavelength multiplexing-demultiplexing element.

BACKGROUND OF THE INVENTION

Along with popularization of the Internet and electronic mail, utilization of communication networks increases remarkably, so that an optical communication system allowing a large capacity of information transmission has been developed. There is an important meaning to improve a degree of wavelength division multiplexing in optical communication system more than that in the present situation. In this case, an optical wavelength multiplexing-demultiplexing element is considered one of the key devices. An optical wavelength multiplexing-demultiplexing element having an optical waveguide structure of an array grating type relates to a passive structure that has a narrow transmission width and a high extinction ratio. Furthermore, such an optical wavelength multiplexing-demultiplexing element has also a characteristic feature of capable of multiplexing and demultiplexing a number of optical signals.

FIG. 1 is a perspective view showing a constitution of a conventional arrayed waveguide grating wherein the arrayed waveguide grating 10 is prepared by defining channel waveguides for input use (hereinafter referred to as "inputting channel waveguides") 12, channel waveguides for output use (hereinafter referred to as "outputting channel waveguides") 13, a channel waveguide array 14 curved entirely in a U-shape, a first sector form slab waveguide 15 for connecting the inputting channel waveguides 12 with the channel waveguide array 14, and a second sector form slab waveguide 16 for connecting the outputting channel waveguides 13 with the channel waveguide array 14 on a substrate 11. The channel waveguide array 14 is constituted such that a length of each of the waveguides composing the channel waveguide array 14 becomes sequentially longer by a difference in waveguide length $\Delta L$.

FIG. 2 is a schematic view showing a constitution of the first sector form slab waveguide on its input and output sides wherein a core of each waveguide in the inputting channel waveguides 12 has a tapered shape, which expands linearly in the vicinity of a boundary with respect to the first sector form slab waveguide 15, while a core of each waveguide in the channel waveguide array 14 has also a tapered shape, which expands linearly in the vicinity of a boundary with respect to the first sector form slab waveguide When optical frequency characteristics are examined with respect to such a conventional arrayed waveguide grating 10, there is a parabolic loss characteristic in the vicinity of a central optical frequency in each of the waveguides. For this reason, when a wavelength of a laser light source deviates from its central optical frequency due to temperature change and the like, there has been a problem of increasing significantly such loss as described above. In order to prevent a sudden change in an output level due to such temperature change and the like as well as to prevent cutting in modulation components because of a narrowed transmission width in case of connecting arrayed waveguide gratings in a multiple stage, transmission characteristics having flat peak levels with respect to optical frequency are required.

Moreover, in a conventional optical communication system having a structure wherein plural stages of such arrayed waveguide gratings 10 are used for a communication network, loss characteristics (or light transmission characteristics) with respect to optical frequency in the case where a light ray passes through one of such arrayed waveguide gratings are repeated in the plural-stage arrayed waveguide gratings, so that loss characteristics with respect to optical frequency exhibit a more precipitous parabolic configuration in the vicinity of its central frequency. Thus, there have been such problems that such an optical communication system is easily affected in the case where a wavelength of a laser light source deviates from its central frequency and that modulation components are easily cut off. In this respect, although a variety of efforts have been made to improve parabolic loss characteristics in an array waveguide grating, it has been difficult to change such a present situation into a better one.

SUMMARY OF THE INVENTION

Accordingly, an object of the present invention is to provide an array waveguide grating having flat optical frequency characteristics.

Another object of the present invention is to provide an optical communication system using an array waveguide grating having flat optical frequency characteristics.

In order to achieve the above-described objects, an arrayed waveguide grating of the invention, as described in a first aspect, comprises (a) a substrate; (b) a first channel waveguide disposed on the substrate; (c) a channel waveguide array disposed on the substrate and constituted in such that each length of waveguides is sequentially longer with a predetermined difference in lengths of the waveguides; (d) a first slab waveguide disposed on the substrate and connecting the first channel waveguide with said channel waveguide array; (e) a second slab waveguide disposed on the substrate and connecting an end of the channel waveguide array on the side wherein the first slab waveguide has not been connected thereto with an end thereof; and (f) a second channel waveguide disposed on the substrate and connected to the other end of the second slab waveguide wherein a waveguide part in the connected area has a parabolic configuration.

Namely, flat optical frequency characteristics are realized by defining a waveguide part of the second channel waveguide connected to an output side of the second slab waveguide in the arrayed waveguide grating into a parabolic configuration in the invention, as described in in the first aspect.

An arrayed waveguide grating of the invention, as described in a second aspect, comprises (a) a substrate; (b) a first channel waveguide disposed on the substrate; (c) a channel waveguide array disposed on the substrate and constituted in such that each length of waveguides is sequentially longer with a predetermined difference in lengths of the waveguides; (d) a first slab waveguide disposed on the substrate and connecting the first channel waveguide with the channel waveguide array; (e) a second slab waveguide disposed on the substrate and connecting an end of the channel waveguide array on the side wherein the first slab waveguide has not been connected thereto with an end thereof; and (f) a second channel waveguide disposed on the substrate and connected to the other end of the second slab waveguide wherein a waveguide part in the connected area has a configuration as a multi-mode interference in which a width of optical waveguide changes step-functionally and discontinuously.

Namely, flat optical frequency characteristics are realized by defining a waveguide part of the second channel waveguide connected to an output side of the second slab waveguide in the arrayed waveguide grating into a configuration of multi-mode interference in which a width of optical waveguide changes step-functionally and discontinuously in the invention, as described in the second aspect.

An arrayed waveguide grating of the invention, as described in a third aspect, comprises (a) a substrate; (b) a first channel waveguide disposed on the substrate; (c) a channel waveguide array disposed on the substrate and constituted in such that each length of waveguides is sequentially longer with a predetermined difference in lengths of the waveguides; (d) a first slab waveguide disposed on the substrate and connecting the first channel waveguide with the channel waveguide array; (e) a second slab waveguide disposed on the substrate and connecting an end of the channel waveguide array on the side wherein the first slab waveguide has not been connected thereto with an end thereof; and (f) a second channel waveguide disposed on the substrate and connected to the other end of the second slab waveguide wherein a waveguide part in the connected area has a rectangular field distribution exciting configuration that excites a rectangular field distribution.

Namely, flat optical frequency characteristics are realized by defining a waveguide part of the second channel waveguide connected to an output side of the second slab waveguide in the arrayed waveguide grating into a rectangular field distribution exciting configuration that excites a rectangular field distribution in the invention, as described in the third aspect.

The invention, as described in a fourth aspect, is characterized in that the parabolic configuration is individually adjusted in response to respective wavelengths of multiplexed optical signals input to the first channel waveguide in the arrayed waveguide grating as described in the first aspect.

Namely, broadening of band in wavelength used in the arrayed waveguide grating is realized by adjusting individually the parabolic configuration in response to respective wavelengths of multiplexed optical signals input to the first channel waveguide in the invention, as described in the fourth aspect.

The invention, as described in a fifth aspect, is characterize in that the configuration as a multi-mode interference is individually adjusted in response to respective wavelengths of multiplexed optical signals input to the first channel waveguide in the arrayed waveguide grating as described in the second aspect.

Namely, broadening of band in wavelength used in the arrayed waveguide grating is realized by adjusting individually the configuration as a multi-mode interference in response to respective wavelengths of multiplexed optical signals input to the first channel waveguide in the invention, as described in the fifth aspect.

The invention as described in a sixth aspect is characterized in that the rectangular field distribution exciting configuration is individually adjusted in response to respective wavelengths of multiplexed optical signals input to the first channel waveguide in the arrayed waveguide grating as described in the third aspect.

Namely, broadening of band in wavelength used in the arrayed waveguide grating is realized by adjusting individually the rectangular field distribution exciting configuration in response to respective wavelengths of multiplexed optical signals input to the first channel waveguide in the invention, as described in the sixth aspect.

The invention as described in a seventh aspect is characterized in that the rectangular field distribution exciting configuration is such a configuration that an angle $\theta w$ defined by a boundary part of an outputting channel waveguide in a starting point from which a width of waveguide changes and a central axis of the waveguide has a value larger than zero degree and smaller than ninety degrees, and tapered configurations are excluded from these resulting configurations in the arrayed waveguide grating as described in the third aspect.

Namely, it is to be made clear that the rectangular field distribution exciting configuration is such a configuration that an angle $\theta w$ defined by a boundary part of an outputting channel waveguide in a starting point from which a width of waveguide changes and a central axis of the waveguide has a value larger than zero degree and smaller than ninety degrees, and tapered configurations, which do not function, are excluded from these resulting configurations in the invention, as described in the seventh aspect.

An optical communication system of the invention, as described in an eighth aspect comprises (a) an optical transmission means for delivering optical signals having respective wavelengths in parallel; (b) a multiplexer composed of arrayed waveguide gratings for subjecting the optical signals having the respective wavelengths delivered from the optical transmission means to wavelength division multiplexing; (c) an optical transmission line for transmitting the optical signals which have been wavelength division-multiplexed and output from the multiplexer; (d) nodes each provided with an arrayed waveguide grating disposed properly in the middle of the optical transmission line; (e) a demultiplexer composed of an arrayed waveguide gratings to which optical signals delivered through the nodes disposed on the optical transmission line are input to separate into each of optical signals having respective wavelengths; and (f) an optical receiver for receiving optical signals having the respective wavelengths separated by the demultiplexer; (g) each of the arrayed waveguide gratings being composed of a substrate; a first channel waveguide disposed on the substrate; a channel waveguide array disposed on the substrate and constituted in such that each length of waveguides is sequentially longer with a predetermined difference in lengths of the waveguides; a first slab waveguide disposed on the substrate and connecting the first channel waveguide with the channel waveguide array; a second slab waveguide disposed on the substrate and connecting an end of the channel waveguide array on the side wherein the first slab waveguide has not been connected thereto with an end thereof; and a second channel waveguide disposed on the substrate and connected to the other end of the second slab waveguide wherein a waveguide part in the connected area has a rectangular field distribution exciting configuration that excites a rectangular field distribution.

Namely, flat optical frequency characteristics are realized by defining a waveguide part of the second channel waveguide connected to an output side of the second slab waveguide in the respective arrayed waveguide gratings constituting a line-like communication system into a rectangular field distribution exciting configuration that excites a rectangular field distribution in the invention, as described in the eighth aspect, wherein the above-described line-like communication system is composed of an optical transmission means for delivering optical signals having respective wavelengths in parallel; a multiplexer composed of arrayed waveguide gratings for subjecting the optical signals having the respective wavelengths delivered from the optical transmission means to wavelength division multiplexing; an optical transmission line for transmitting the optical signals which have been wavelength division-multiplexed and output from the multiplexer; nodes each provided with an arrayed waveguide grating disposed properly in the middle of the optical transmission line; a demultiplexer composed of an arrayed waveguide gratings to which optical signals delivered through the nodes disposed on the optical transmission line are input to separate into each of optical signals having respective wavelengths; and an optical receiver for receiving optical signals having the respective wavelengths separated by the demultiplexer.

An optical communication system of the invention, as described in a ninth aspect, comprises (a) an arrayed waveguide grating having a circular transmission line prepared by connecting circularly a plurality of nodes by the use of transmission lines and transmitting optical signals which have been wavelength division-multiplexed to these transmission lines, and separating the wavelength division-multiplexed optical signals into optical signals having respective wavelengths; and an arrayed waveguide grating for wavelength division-multiplexing optical signals, which have been separated into those having respective wavelengths; (b) each of these respective arrayed waveguide gratings being composed of a substrate; a first channel waveguide disposed on the substrate; a channel waveguide array disposed on the substrate and constituted in such that each length of waveguides is sequentially longer with a predetermined difference in lengths of the waveguides; a first stab waveguide disposed on the substrate and connecting the first channel waveguide with the channel waveguide array; a second slab waveguide disposed on the substrate and connecting an end of the channel waveguide array on the side wherein the first slab waveguide has not been connected thereto with an end thereof; and a second channel waveguide disposed on the substrate and connected to the other end of the second slab waveguide wherein a waveguide part in the connected area has a rectangular field distribution exciting configuration that excites a rectangular field distribution.

Namely, flat optical frequency characteristics are realized by defining a waveguide part of the second channel waveguide connected to an output side of the second slab waveguide in the respective arrayed waveguide gratings constituting a circular communication system into a rectangular field distribution exciting configuration that excites a rectangular field distribution in the invention, as described in the ninth aspect, wherein the above-described circular communication system is composed of an arrayed waveguide grating having a circular transmission line prepared by connecting circularly a plurality of nodes by the use of transmission lines and transmitting optical signals which have been wavelength division-multiplexed to these transmission lines, and separating the wavelength division-multiplexed optical signals into optical signals having respective wavelengths; and an arrayed waveguide grating for wavelength division-multiplexing optical signals, which have been separated into those having respective wavelengths.

BRIEF DESCRIPTION OF THE DRAWINGS

The present invention will be explained in more detail in conjunction with the appended drawings, wherein.

DESCRIPTION OF THE PREFERRED EMBODIMENTS

Embodiments of the present invention will be described in detail hereinafter by referring to the accompanying drawings.

Figure 3:
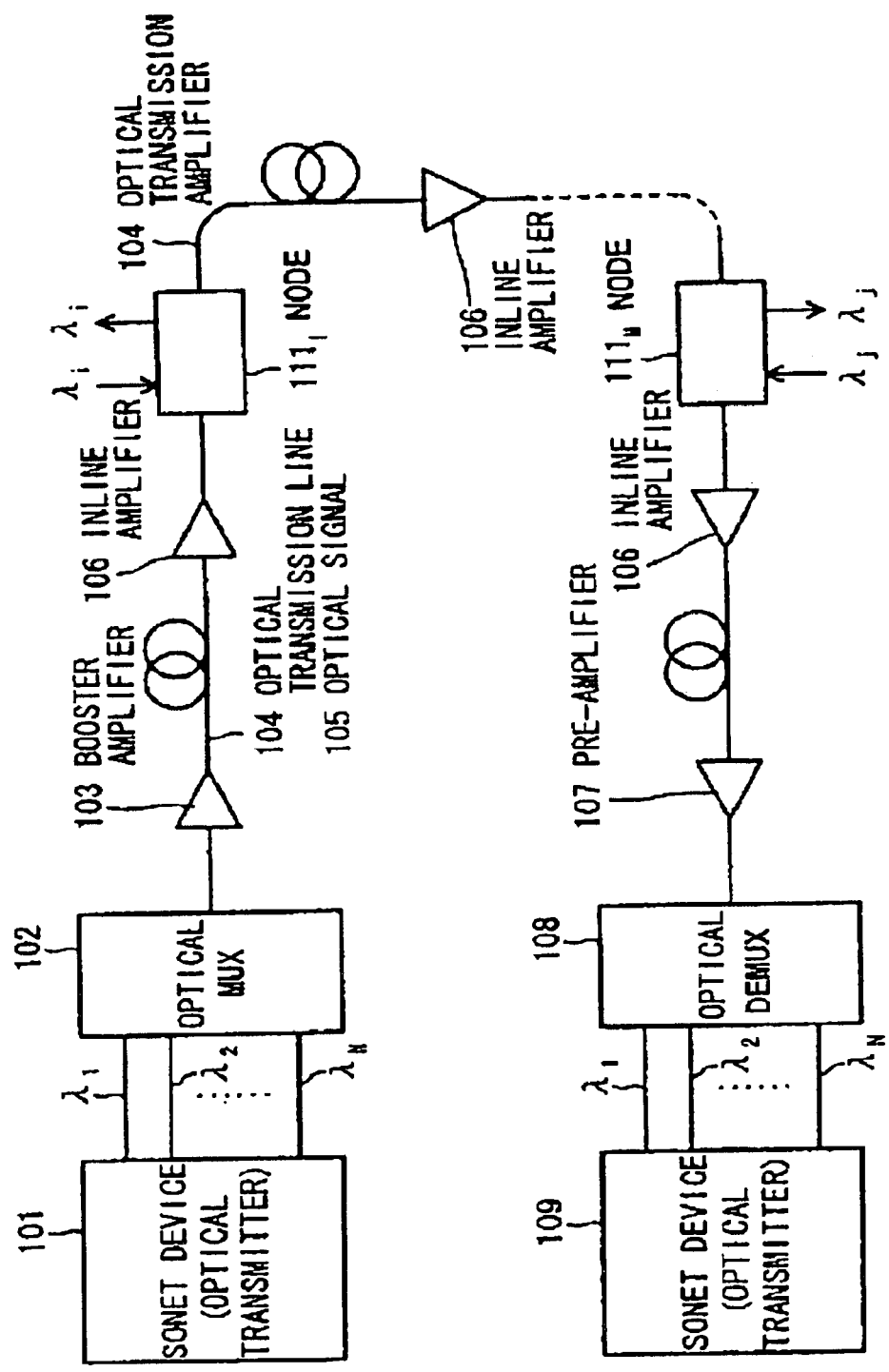
FIG. 3 is a systematic constitutional diagram illustrating an outline of a constitution of an optical communication system according to an embodiment of the present invention.

FIG. 3 is a block diagram illustrating an outline of a constitution of an optical communication system in an embodiment of the present invention. In the optical communication system, optical signals corresponding to N channels of wavelengths $\lambda_1$ to $\lambda_N$ delivered from a SONET (Synchronous Optical Network) device (optical transmitter) 101 disposed on a transmission side are multiplexed by an optical multiplexer 102, and amplified by a booster amplifier 103 to deliver to an optical transmission line 104. The optical multiplexer 102 is composed of an arrayed waveguide grating (AWG). Optical signals thus multiplexed 105 are amplified properly by an inline amplifier 106, and then, the multiplexed signals thus amplified are supplied through a pre-amplifier 107, and separated by an optical demultiplexer (DMUX) 108 into those of original wavelengths $\lambda_1$ to $\lambda_N$. These optical signals thus separated are received by a SONET device (optical receiver) 109. On the optical transmission line 104 on the way to the SONET device, a suitable number of nodes (OADM) $111_1$, to $111_M$ have been disposed. In these nodes $111_1$ to $111_M$, an optical signal having a desired wavelength is input or output.

Figure 4:
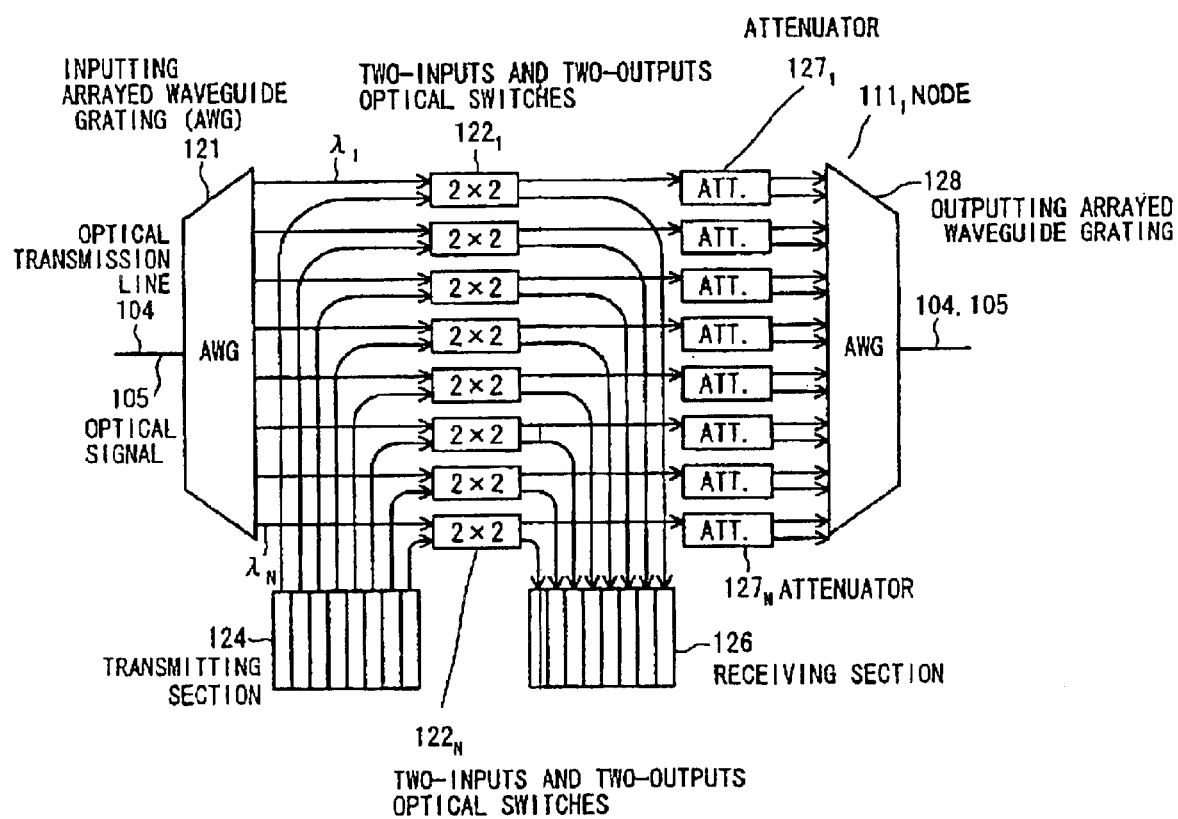
FIG. 4 is a block diagram showing an outline of a constitution of nodes used for an optical communication system according to the present embodiment.

FIG. 4 illustrates an outline of a constitution of nodes wherein a first node $111_1$ is shown, but any of second to M-th nodes $111_2$ to $111_M$ has the same constitution as that of the first node $111_1$ in theory. Optical signals are input to an arrayed waveguide grating (AWG) 121 on an input side of the first node $111_1$ through the light transmission line 104 shown in FIG. 3 to be demultiplexed in to optical signals corresponding to N channels of wavelengths of $\lambda_1$ to $\lambda_N$, which are dropped into a receiving section 126 on a side of the nodes of optical signals having the respective wavelengths $\lambda_1$ to $\lambda_N$ by means of two-inputs and two-outputs optical switches $122_1$ to $122_N$ provided in every respective wavelengths $\lambda_1$ to $\lambda_N$, while optical signals transmitted from a transmitting section 124 on the side of the nodes are added thereby. Each output side of the two-inputs and two-outputs optical switches $122_1$, to $122_N$ is arranged such that a gain of which is adjusted by each of attenuators (ATT) $127_1$ to $127_N$ provided correspondingly to the optical switches $122_1$ to $122_N$, and then it is input to an arrayed waveguide grating 128 on an output side. The arrayed waveguide grating 128 on the output side is an element having a reverse constitution of the arrayed waveguide grating 121 on the input side, wherein optical signals corresponding to N channels having wavelengths $\lambda_1$ to $\lambda_N$ are multiplexed to deliver the optical signals thus multiplexed to the optical transmission line 104 as the optical signals 105.

As described above, the second to the M-th nodes $111_2$ to $111_M$, the optical multiplexer 102, and the optical multiplexer 108 shown in FIG. 3 including the first node $111_1$ shown in FIG. 4 use together arrayed waveguide gratings. Accordingly, flatter optical frequency characteristics of arrayed waveguide grating are requested under a demand wherein the number N of channels in the optical signals 105 increases.

Figure 5:
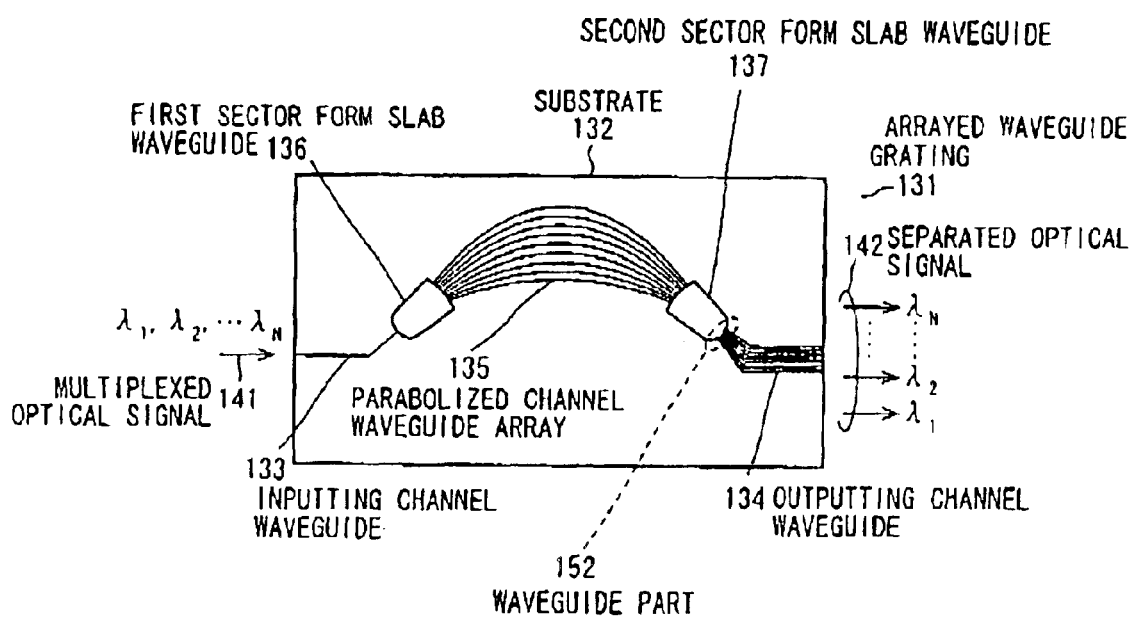
FIG. 5 is a perspective view showing an appearance of an arrayed waveguide grating according to the present embodiment.

FIG. 5 is a view illustrating an appearance of an arrayed waveguide grating used in the present embodiment wherein an arrayed waveguide grating 131 of the present embodiment is prepared by forming an inputting channel waveguide 133 as well as an outputting channel waveguide 134, a parabolized channel waveguide array 135, a first sector form slab waveguide 136 for connecting the inputting channel waveguide 133 with the channel waveguide array 135, and a second sector form slab waveguide 137 for connecting the outputting channel waveguide 134 with the channel waveguide array 135 on a substrate 132. The channel waveguide array 135 is constituted such that a length of each of the waveguides composing the channel waveguide array 135 becomes sequentially longer by a difference in waveguide length ΔL. It is arranged such that multiplexed optical signals 141 having wavelengths $\lambda_1$ to $\lambda_N$ are input to the inputting channel waveguide 133, while optical signals 142 separated respectively into wavelengths $\lambda_1$ to $\lambda_N$ are output from the outputting channel waveguide 134.

In the arrayed waveguide grating 131 of the present embodiment, a semiconductor (silicon) substrate is used as the substrate 132. As an under cladding layer, a quartz-based material to which phosphorous, germanium, titanium, boron, fluorine or the like has been added is deposited in a thickness of several tens $\mu$m on the semiconductor substrate in accordance with a manner such as flame deposition method, CVD method, sputtering method, spin coating method, and electron beam depositing method. Then, a quartz core layer to which an impurity has been added so as to have a higher refractive index than that of the under layer cladding layer is deposited on the resulting substrate with a thickness of around three to eight $\mu$m to fabricate a core layer of an optical waveguide shape as shown in FIG. 5. Fabrication of the core layer is made by transferring a fine region to an appropriate masking material by the use of photolithography, and then removing an unnecessary region in accordance with a dry etching method wherein a reactive ion etching (RIE) device, a reactive ion beam etching (RIBE) device or the like device is used. Finally, the above-described quartz-based material a refractive index of which has been made to be lower than that of the core layer is again used to deposit an upper cladding layer of a thickness of several tens $\mu$m on the resulting substrate.

Figure 6:
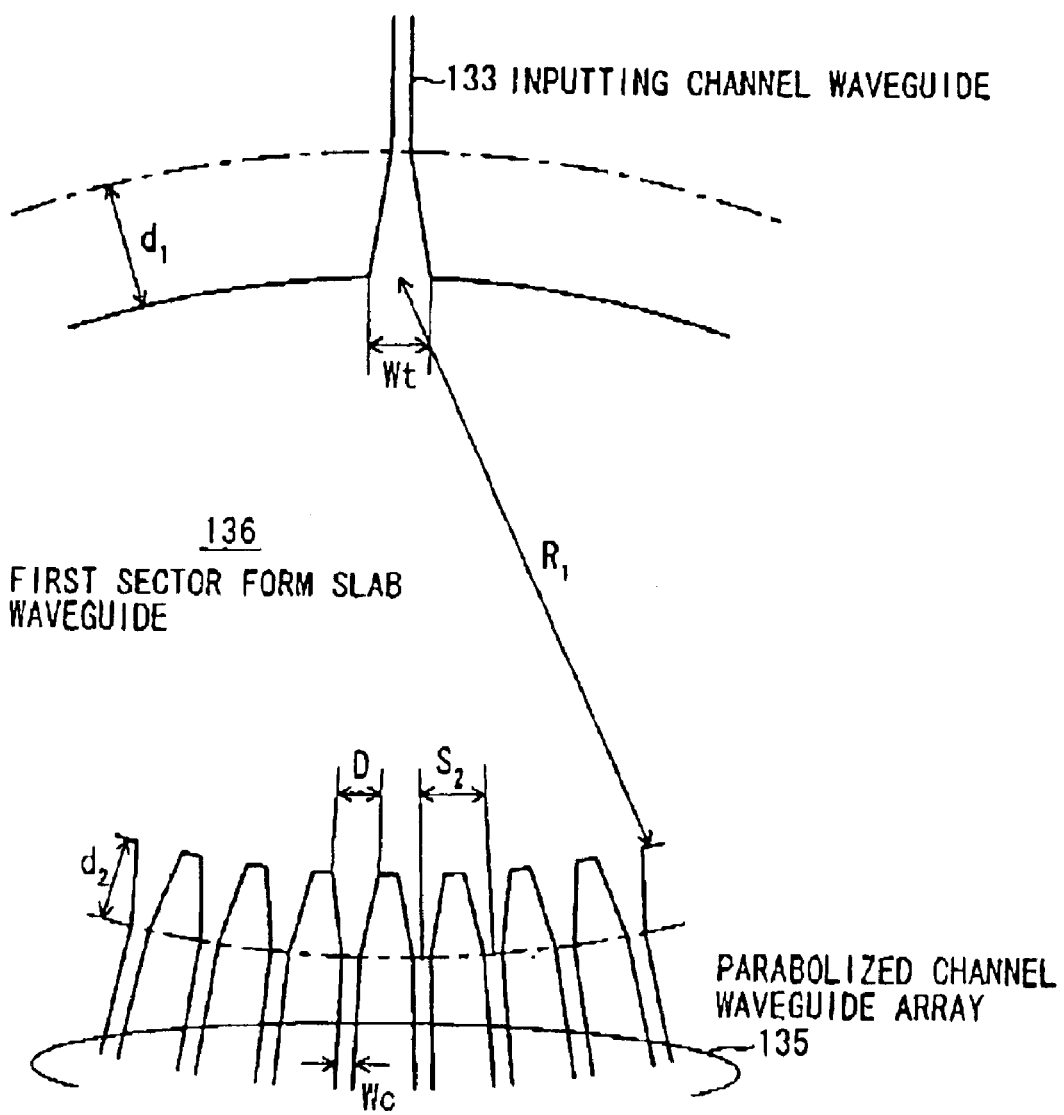
FIG. 6 is a plan view showing a constitution of a first sector form slab waveguide, an inputting channel waveguide connected thereto, and a connected section of a channel waveguide array in the present embodiment.

FIG. 6 illustrates a constitution of a first sector form slab waveguide, an inputting channel waveguide connected thereto, and a connected section of a channel waveguide array wherein the inputting channel waveguide 133 expands in a tapered shape over a length $d_1$ on the side, which is to be connected to the first sector form slab waveguide 136. A core opening width (optical waveguide width) of the inputting channel waveguide 133 is represented by Wt, and a radius of curvature of the first sector form slab waveguide 136 is represented by $R_1$. The channel waveguide array 135 to be connected to the first sector form slab waveguide 136 exhibits each core width of Wc, and each side towards the first sector slab waveguide 136 expands over a length $d_2$ into a tapered shape. A core opening width in the channel waveguide array is designated by D, and a distance of the channel waveguide array 135 is designated by $S_2$. Constitutions on an input side and an output side of such a first sector form slab waveguide do not particularly differ from those of conventional constitutions shown in FIG. 2.

Figure 7:
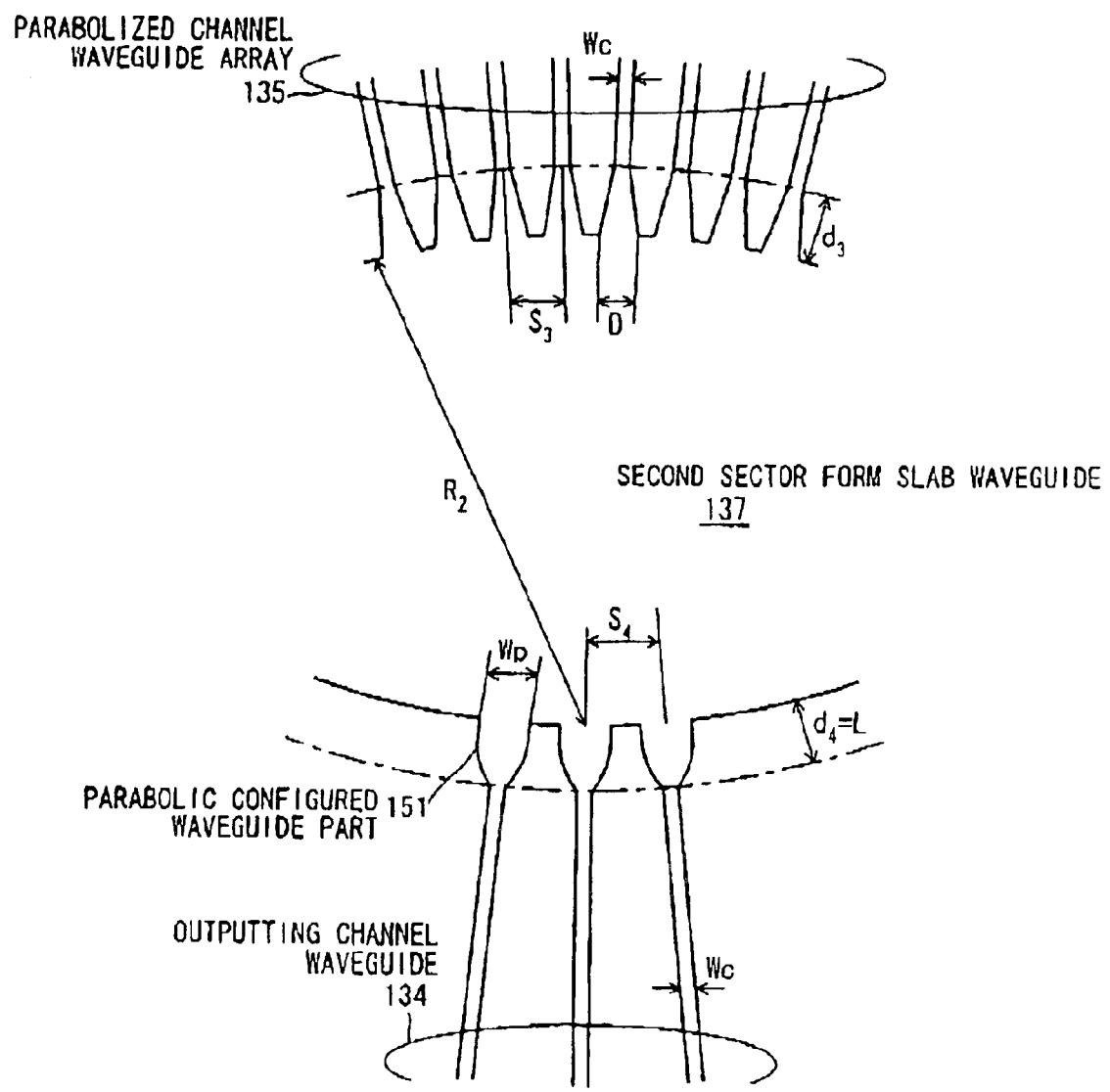
FIG. 7 is a plan view showing an essential part of a second sector form slab waveguide, a channel waveguide array connected thereto, and a connected section of an outputting channel waveguide in the present embodiment.

FIG. 7 illustrates a constitution of a second sector form slab waveguide, a channel waveguide array connected thereto, and a connected section of an outputting channel waveguide wherein the channel waveguide array 135 expands in a tapered shape over a length $d_3$ on the side, which is to be connected to the second sector form slab waveguide 137. A core width of the channel waveguide array 135 before expanding the tapered shape is designated by Wc, and a core opening width is designated by D. A radius of curvature of the second sector form slab waveguide 137 is represented by $r_2$, while a distance of the channel waveguide array 135 is represented by $S_3$.

A waveguide part of the outputting channel waveguide 134 is in a parabolic configuration over a length $d_4$. A core width connected to the parabolic configured waveguide part 151 is designated by Wc, and a core opening width is designated by Wp. In the present embodiment, the parabolic waveguide part 151 changes its shape in response to respective wavelengths $\lambda_1$ to $\lambda_N$ of the optical signals 142 shown in FIG. 5 wherein a length $d_4$ is conveniently represented by a length L.

A light beam input to the inputting channel waveguide 133 in the arrayed waveguide grating 131 shown in FIG. 5 travels in a direction of the first sector form slab waveguide 136 with a field distribution of substantially Gaussian distribution in the case when the light beam passes through its tapered waveguide part shown in FIG. 6. An expanse of this field distribution is determined by an optical waveguide width Wt at the terminal of a taper. A light beam having this field distribution travels with a lateral expansion in the first sector form slab waveguide 136, and excites respective waveguides in the channel waveguide array 135. As a result, the light beams are condensed respectively at positions corresponding to optical frequency f in the outputting channel waveguide 134 or those corresponding to wavelength $\lambda_1$ to $\lambda_N$ in the second sector form slab waveguide 137. In this case, an optical distribution in a boundary defined between the second sector form slab waveguide 137 and the outputting channel waveguide 134 becomes also Gaussian distribution because of a reciprocity theorem.

Figure 8:
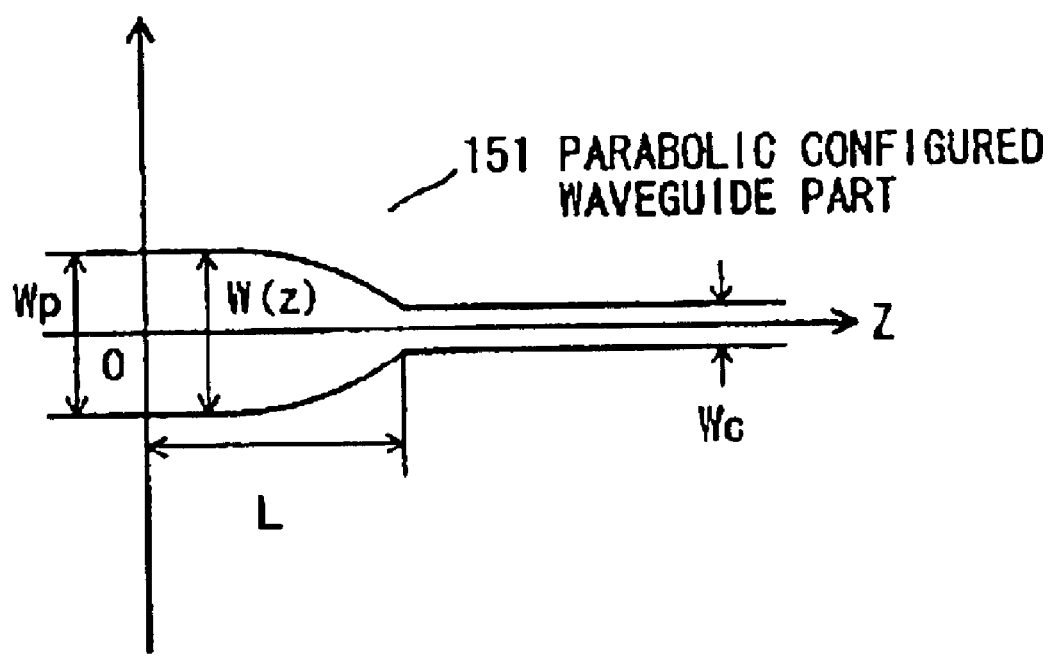
FIG. 8 is an explanatory view showing specifically a parabola-shaped waveguide part.

FIG. 8 illustrates specifically a parabola-shaped waveguide part wherein the parabolic waveguide part 151 has a core opening width Wp, a length L, and a core width Wc connected to the parabolic waveguide part 151. When a width at an appropriate position of the waveguide part 151 is assumed to be W (z), it maybe represented by the following expression (1).

$$W(z) = \{2\alpha\lambda/n_{eff}(L-z) + Wc^2\}^{1/2} \quad (1)$$

wherein $\alpha$ is a constant, $\lambda$ is an optical wavelength, neff is an effective index, L is a length of parabolic portion, Wc is a width of the outputting channel optical waveguide 134, and z is a coordinate in a Z axis.

In the expression (1), the core opening width Wp is widely set out such that it is one to five times wider than a width of Gaussian distribution produced in a boundary between the second sector form slab waveguide 137 and the outputting channel waveguide 134. Accordingly, an amount of light beam to be coupled to the outputting channel waveguide 134 is kept substantially constant, even if a frequency f of a laser light source varies in some degree due to temperature change and the like. For this reason, flat optical frequency characteristics wherein a demultiplexing output becomes substantially constant can be realized, even if the frequency f of the light source changes.

Meanwhile, in an arrayed waveguide grating of the present embodiment, transmission optical frequency characteristics in which there is a small difference between respective channels have been realized by correcting parabolic parameters in the respective outputting channel optical waveguides 134, as described above, in response to demultiplexed, respective optical frequencies f.

Figure 9:
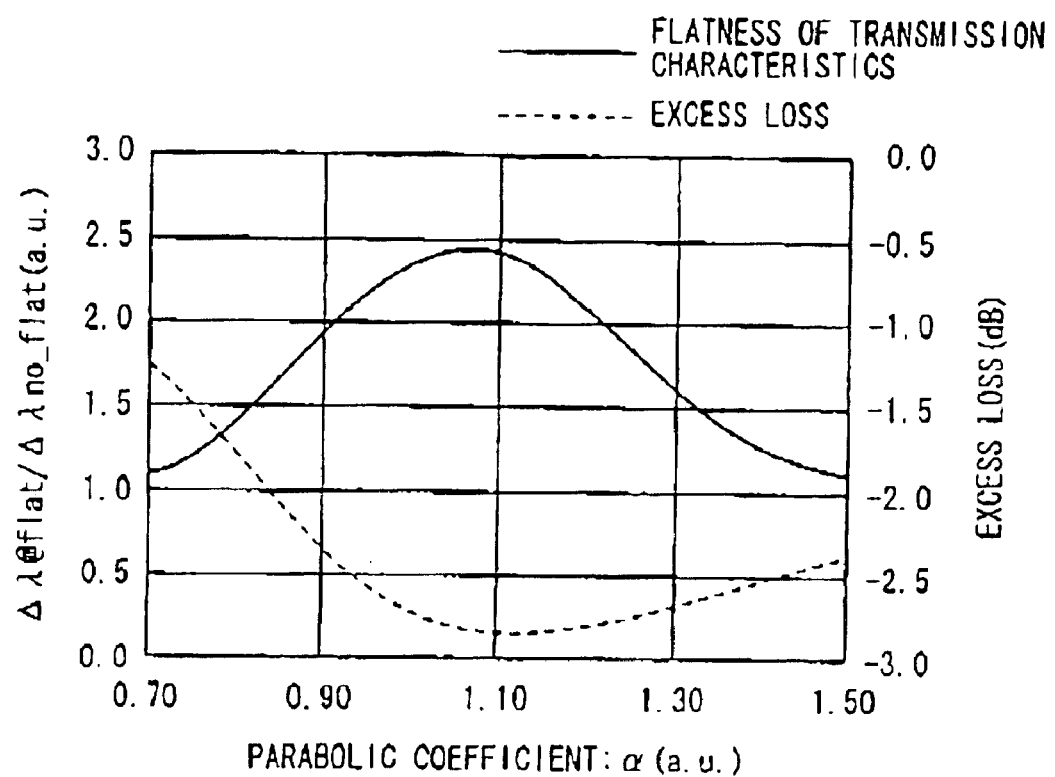
FIG. 9 is a graphical representation indicating results of calculation in changes of transmission width and insertion loss with respect to a parabola-shaped coefficient α in comparison with those, which have been not flattened in respect of optical frequency characteristics.

FIG. 9 is a graphical representation indicating results of a calculation in changes of transmission width and insertion loss with respect to a parabolic coefficient $\alpha$ in comparison with those wherein no flattening has been effected in respect of optical frequency characteristics wherein an axis of ordinate represents flatness and excess loss in the case where the constant a is allowed to change thereby varying parabolic shapes. In this respect, the flattest characteristic is obtained in the vicinity where the parabolic coefficient $\alpha$ is at 1.10. In the arrayed waveguide grating 131, although a flatness can be assured through an arrangement of making a connected section with the first sector slab waveguide 136 of the inputting channel waveguide 133 to be a parabolic waveguide part as described hereunder, it is understood that the same effects can be obtained by making the waveguide part 152 in which the outputting channel waveguides 134 are connected to the second sector form slab waveguide 137 to be parabolic as in the present embodiment.

Figure 1:
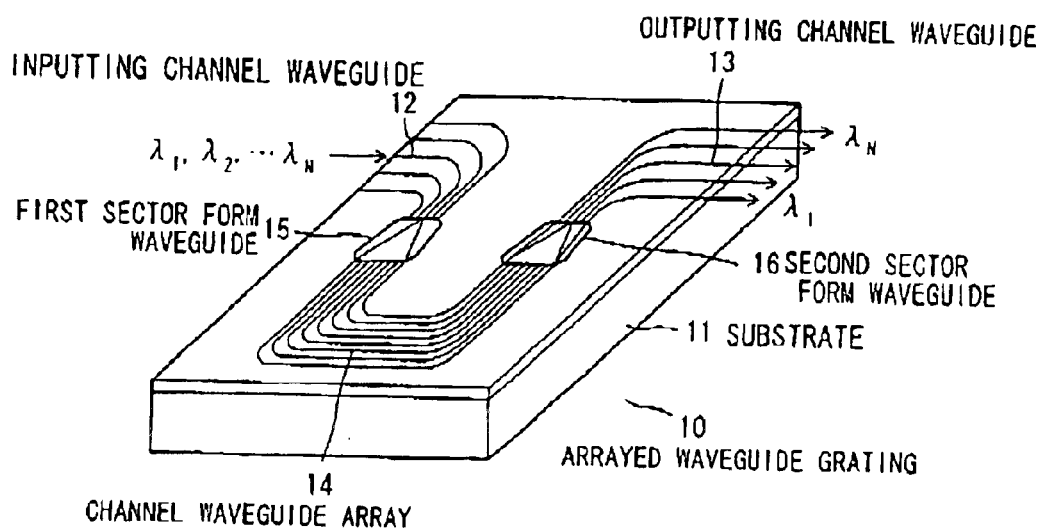
FIG. 1 is a perspective view showing a constitution of a conventional arrayed waveguide grating.
Figure 10:
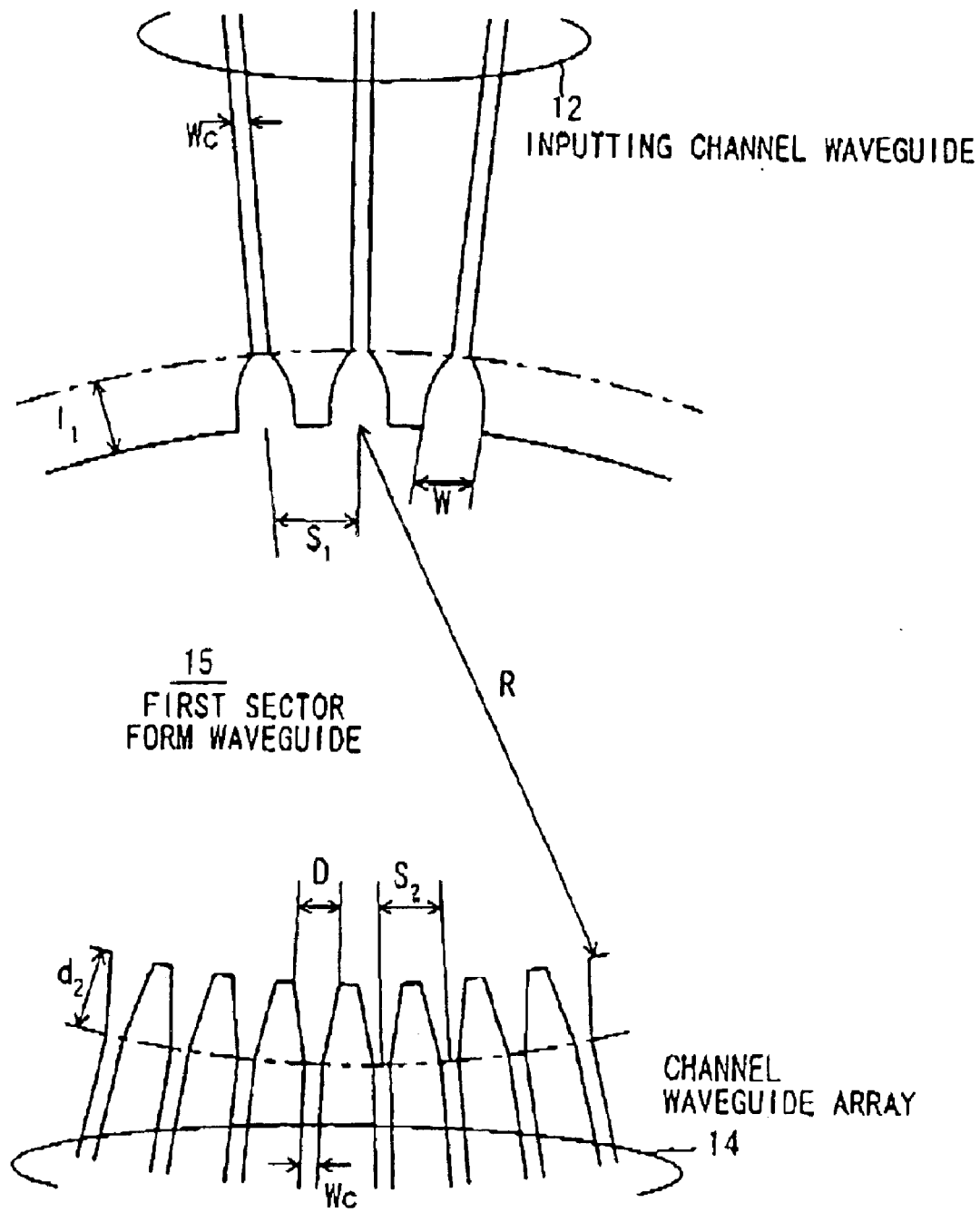
FIG. 10 is a plan view showing an essential part of a constitution based on such a proposal that a configuration of a connected section of an inputting channel waveguide and a first sector form slab waveguide is made to correspond to a parabolic waveguide part.

FIG. 10 illustrates a constitution of a connected section relating to a proposal wherein the connected section with an inputting channel waveguide of a first sector slab waveguide is used as a parabolic waveguide part. In FIG. 10 illustrating the proposal disclosed in Japanese Patent Kokai No. 9-297228, the same components in FIG. 10 as that of FIG. 1 are represented by the same reference characters as those of FIG. 1 therein in order to discriminate an embodiment of the present invention from that of the proposal. In the proposal of FIG. 10, each core of waveguides of an inputting channel waveguide 12 disposed in the vicinity of a boundary with respect to a first sector form slab waveguide 15 has a parabolic shape, while each core of waveguides in a channel waveguide array 14 in the vicinity of a boundary with respect to the first sector form slab waveguide 15 exhibits a tapered shape expanding linearly wherein a radius of curvature of the first sector form slab waveguide 15 is represented by a reference character R, and a core opening width of a parabolic waveguide in the inputting channel waveguide 12 is represented by a reference character W. A reference character $S_1$ designates a distance of the inputting channel waveguide 12, $1_1$ a length of a parabolic waveguide part, D a core opening width in each tapered waveguide in the channel waveguide array 14, Wc a core width in each channel waveguide part, $S_2$ each distance in the channel waveguide array 14, and $d_2$ a length of each tapered waveguide, respectively. In the proposal shown in FIG. 10, realization of transmission characteristics wherein a peak level is flat with respect to optical frequency is considered possible.

In the proposal shown in FIG. 10, however, there is a limitation that results in the case where a degree of wavelength division multiplexing is further elevated for the sake of allowing a large capacity of information transmission to be possible. The situation will be explained hereinafter. In the arrayed waveguide grating of the proposal shown in FIG. 10, each parabolic waveguide part resides on its input side. Accordingly, even though a core opening width D as a tapered width on a side of the channel waveguide array 14 can be individually made in response to a wavelength, core-opening widths W employ one parabolic waveguide part being common with respective wavelengths, so that they must be common. Furthermore, the coefficient $\alpha$ shown in the above expression (1) becomes constant.

On the other hand, in the case where parabolic waveguide parts 151 (e.g., see FIG. 8) reside individually at positions corresponding to respective wavelengths $\lambda_1$ to $\lambda_N$ as in the present embodiment, a core opening width (optical waveguide width) Wt (e.g. see FIG. 6) is common, but a core opening width Wp may be set out in response to the respective wavelengths $\lambda_1$ to $\lambda_N$. Moreover, $\alpha$ coefficient $\alpha$ can be also set out in response to them. For this reason, a degree of freedom is wider than that shown in the proposal of FIG. 10. Thus, delicate adjustment of transmission optical frequency characteristics with respect to an optical frequency f can be performed.

Supplementary explanation will be made upon such a delicate adjustment of transmission optical frequency characteristics with respect to an optical frequency f. Wavelength dependency of optical transmission characteristics in respect of an arrayed waveguide grating is small in a wavelength range, which has been conventionally used, but such wavelength dependency increases with developments in a trend toward broadband, so that differences in the characteristics could not have been ignored. As to a tendency of wavelength dependency, a higher-order mode comes to be more easily excited in general with closer approach toward a side of short wavelength, while it becomes difficult to obtain a waveguide with closer approach toward a side of long wavelength, so that a problem of cut-off arises. In an arrayed waveguide grating, excitation of a rectangular field distribution being a higher-order mode is used. As a result, such rectangular field distribution is easily excited with closer approach toward a side of short wavelength, whereby flatness in optical transmission characteristics increases. On the contrary, flatness in optical transmission characteristics decreases with closer approach toward a side of long wavelength. Concerning a propagation loss being a factor of insertion loss, it increases with closer to a side of long wavelength. As to a side of short wavelength, it decreases until such propagation loss reaches a certain range of wavelength wherein any higher-order mode is not excited.

In order to eliminate the wavelength dependency having characteristics as described above, adjustments may be made upon these coefficients α, core opening widths Wt and Wp such that a slight increase in flatness and slight decrease in loss are compensated in a region of short wavelength (it tends to increase adversely with closer approach toward a side of the short wavelength). On the other hand, adjustments maybe made upon these coefficients α, core-opening widths Wt and Wp such that a slight decrease in flatness and slight increase in loss are compensated in a region of long wavelength.

Figure 2:
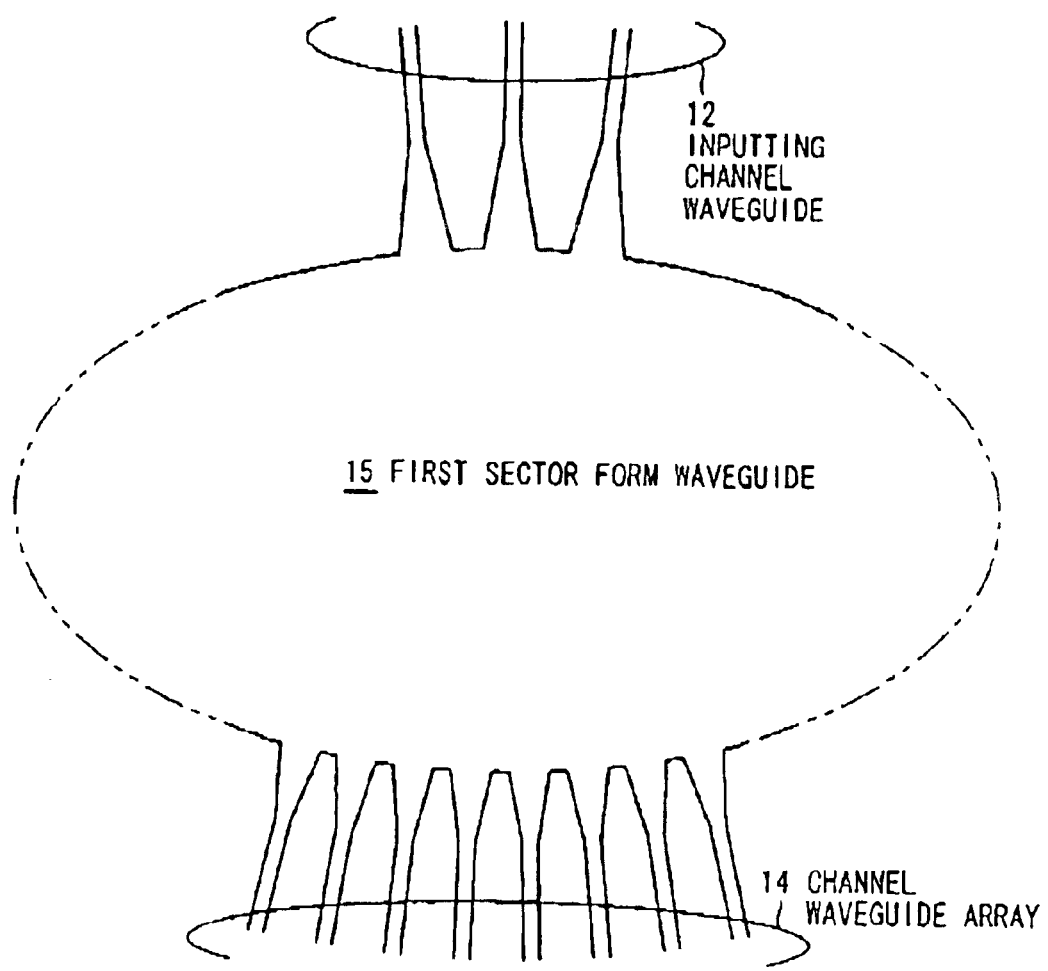
FIG. 2 is a schematic view showing a constitution of a first sector form slab waveguide on its input and output sides in the arrayed waveguide grating shown in FIG. 1.
Figure 11:
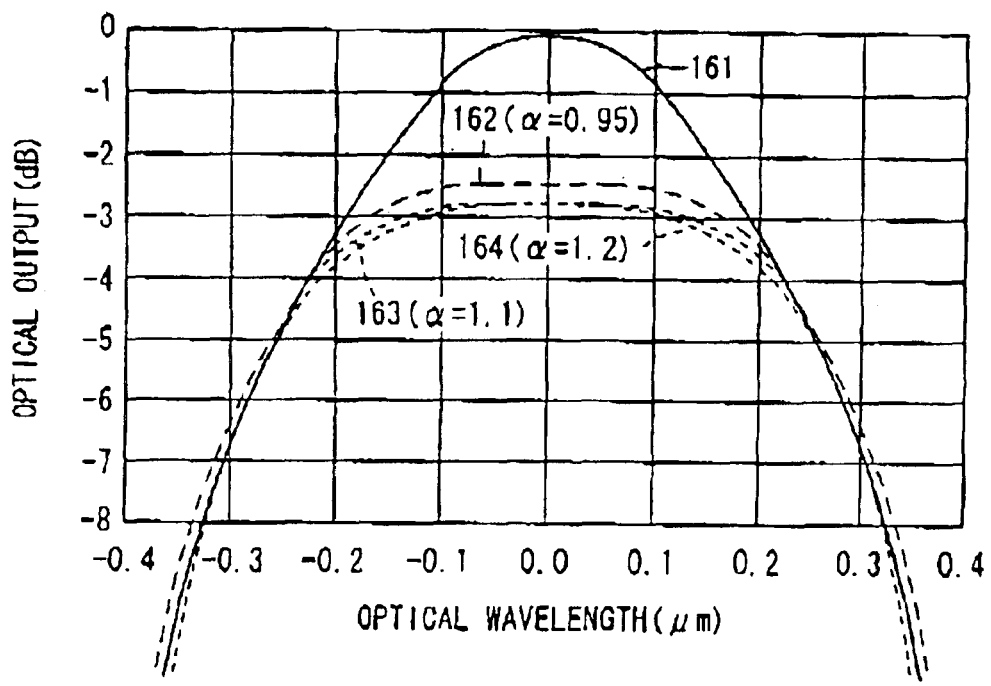
FIG. 11 is a graphical representation indicating results of a variety of calculations with respect to transmission frequency characteristics.

FIG. 11 is a graphical representation indicating results of a variety of calculations as to transmission frequency characteristics wherein a curve 161 indicates optical outputs with respect to respective optical wavelengths in case of non-flattening wherein no flattening has been made as described in FIGS. 1 and 2. In the graphical representation, a curve 162 indicates optical outputs with respect to respective optical wavelengths in the case where a coefficient α is made to be 0.95, a curve 163 indicates optical outputs with respect to respective optical wavelengths in the case where a coefficient α is made to be 1.1, and a curve 164 indicates optical outputs with respect to respective optical wavelengths in the case where a coefficient α is made to be 1.2, respectively.

Consideration will be made on the basis of the curve 163 wherein the coefficient α is 1.1. The curve 162 wherein the coefficient α is 0.95 indicates the one wherein a loss is changed in a transmission width with no change. On one hand, when a transmission width is changed with respect to transmission characteristics represented by a curve 163 with keeping a lose as it is, transmission characteristics represented by a curve 164 wherein a coefficient α is 1.2 are obtained. As described above, in case of the arrayed waveguide grating 131 (FIG. 5) of the present embodiment, when it is adjusted to an appropriate parameter, differences between transmission frequency characteristics between respective channels may be corrected to turn in a slight difference.

Therefore, an arrayed waveguide grating broad band operability of which is more elevated than that of the arrayed waveguide grating proposed in FIG. 10 can be realized. Besides, disadvantages such that a transmission width becomes narrow or that a modulation component is cut off can be eliminated.

Modified Example

Figure 12:
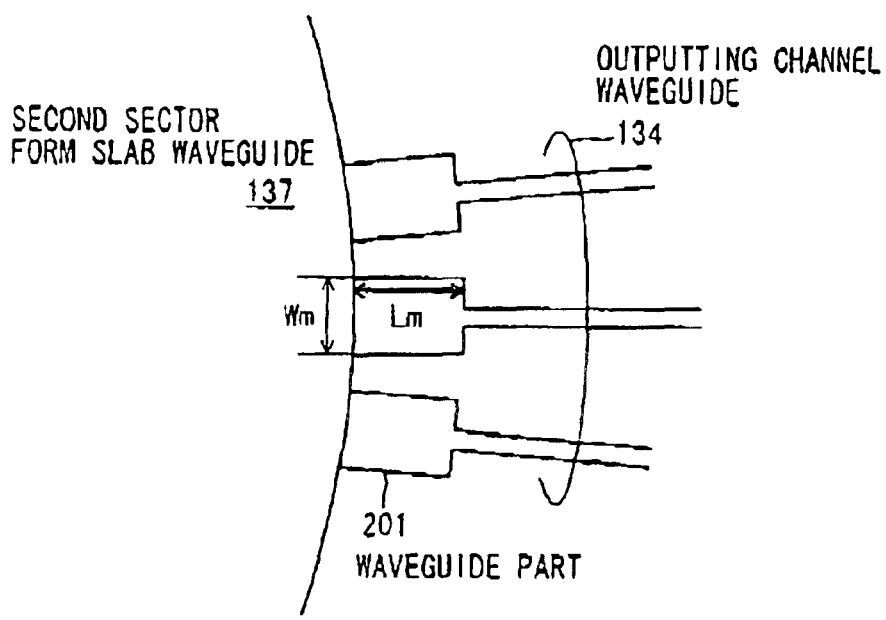
FIG. 12 is an essential plan view showing an essential part of an arrayed waveguide grating wherein MMI optical waveguides are used on an output side of a second sector form slab waveguide as a modified example of the present invention.

FIG. 12 illustrates an essential part of an arrayed waveguide grating wherein an MMI (Multi-Mode Interference) optical waveguide is used as a modified example of the present invention. A section shown in FIG. 12 indicates the same range as the waveguide part 152 wherein the outputting channel waveguide 134 is connected to the second sector form slab waveguide 137 in FIG. 5. The MMI optical waveguide has a configuration wherein a width of optical waveguide changes step-functionally and discontinuously. Thus, when each waveguide part 201 of the outputting channel waveguide 134 to be connected to the second sector form slab waveguide 137 is made in the form of MMI optical waveguide, disadvantages in the case where the waveguide part has been made tapered can be eliminated as in the above-described case.

In this case, the waveguide part 201 has a core opening width Wm, and a length Lm. These values can be set up in response to respective wavelengths $\lambda_1$ to $\lambda_N$, whereby a degree of wave division multiplexing can be more elevated than that proposed in FIG. 10.

Possibility of Modification in the Invention

Figure 13:
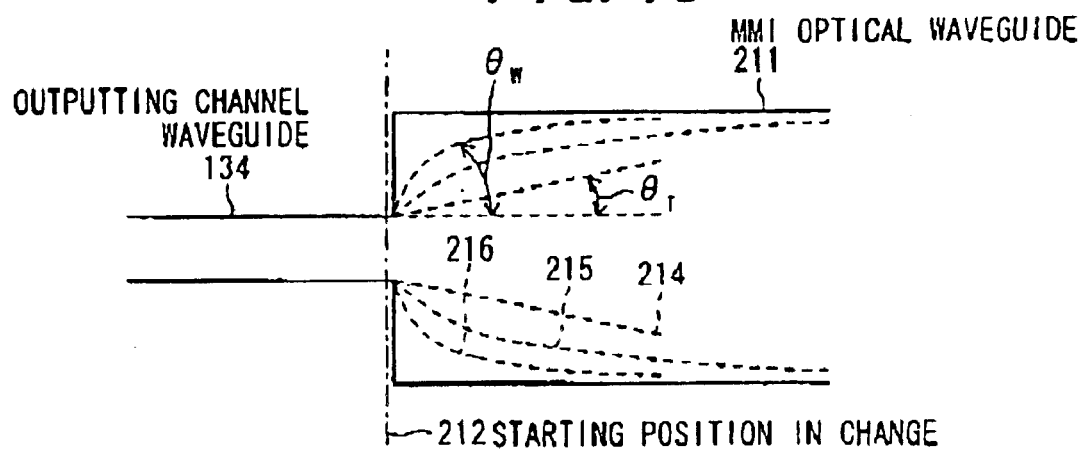
FIG. 13 is an explanatory view showing modifiability in a configuration of an outputting channel waveguide to be connected to a second sector form slab waveguide.

FIG. 13 is a schematic view wherein a possibility in a configuration of each outputting channel waveguide to be connected to a second sector form slab waveguide is considered. In the same figure, a configuration of the MMI optical waveguide described in FIG. 12 is represented by a solid line. In the MMI optical waveguide 211, an outputting channel waveguide 134 is folded outwardly at a right angle from a position starting with changes in a width of the optical waveguide. On the other hand, in the case of an inputting channel waveguide to be connected to a conventional sector form slab waveguide 136 shown in FIG. 6 and the like, the inputting channel waveguide is in a tapered configuration wherein it is folded outwardly at a predetermined angle by $\theta_T$, which is smaller than 90 degrees, as shown by a two-dot chain line 214 in FIG. 13.

As already described, when a waveguide part to be connected to the second sector form slab waveguide 137 of the outputting channel waveguide 134 has a tapered shape, its optical distribution becomes a Gaussian distribution. Accordingly, a curve except for such a configuration wherein a waveguide part is tapered, for example, curves 215 and 216 can realize flat optical frequency characteristics wherein a demultiplexing-output becomes substantially constant, even if a frequency f of a light source changes likewise. In a tapered configuration as the one a width of which changes gradually into linear function, excitation in a higher-order mode does not appear. Since such a tapered configuration as described above exhibits adiabatic changes, it is unsuitable for a rectangular field distribution exciting configuration, so that such configuration is to be excluded.

Therefore, when such a configuration satisfying the above-described angular conditions is realized by means of a function such as a higher-, for example, a third-, a fourth-, or the like-order function, and Hamming function, it becomes also possible to obtain flat optical frequency characteristics. In general, such a rectangular field distribution exciting configuration is the one wherein an angle θw defined by a boundary part of the outputting channel waveguide 134 at a position starting changes in a width of the waveguide and a central axis of the waveguide is within the following angular range. In this case, however, a tapered configuration is excluded.

0°<θw=90° wherein a condition 0°<θw of the lower limit is due to necessity wherein an optical waveguide must be kept wide, because of a demand for higher-order excitation. On one hand, the upper limit of θw<90°is due to a purpose for preventing unnecessary coupling before arriving at a width changing region.

Furthermore, although such a case that a waveguide part to be connected to the second sector form slab waveguide 137 of the outputting channel waveguide 134 is connected to a single type of a curved or linear configuration has been described in the embodiment and the modified example, the invention is not limited thereto. An example oaf the case other than that described above will be described hereinafter.

Figure 14:
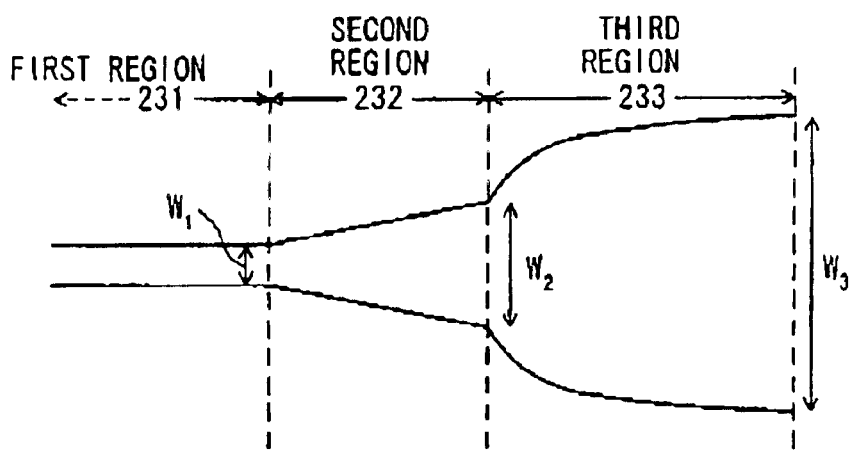
FIG. 14 is an explanatory view showing a modified example wherein a section for connecting an outputting channel waveguide with a second sector form slab waveguide has a configuration obtained by connecting a first to a third regions with each other.

FIG. 14 illustrates a case wherein a section in which an outputting channel waveguide is to be connected to a second sector form slab waveguide has a configuration obtained by connecting a first to a third regions with each other. Among these regions, the first region 231 is a waveguide part having a constant width $W_1$, the second region 232 is a waveguide part having a configuration expanding from the width $W_1$ to a wider width $W_2$ in a tapered shape, and the third region 233 has a configuration wherein it is connected to the second region 232 at a position where the second region 232 has the width $W_2$ and from which it expands to a part having a wider width $W_3$ than the width $W_2$, whereby this configuration defines a rectangular field distribution exciting configuration that excites rectangular field distribution. While such a case where the width $W_2$ is wider than the width $W_1$ in the outputting channel waveguide has been illustrated in FIG. 14, the invention is not limited thereto. Namely, either a case where the width $W_1$ is equal to the width $W_2$, or a case where the width $W_1$ is wider than the width $W_2$ is available. Moreover, the second region 232 has not necessarily been a configuration exhibiting a linear variation, but it may be a curved configuration wherein the first region 231 is smoothly connected to the second region 232 as a matter of course.

In the above-mentioned embodiment and the modified example, such an optical communication system that a plurality of arrayed waveguide gratings are disposed on a transmission line connecting an optical transmitter with an optical receiver as shown in FIG. 3 has been described. The present invention may be applied not only to an optical communication system using such linear transmission line, but also to an optical communication system wherein a plurality of nodes or arrayed waveguide gratings are circularly disposed, as a matter of course.

Besides, although an example wherein a sector form slab waveguide is used as a slab waveguide has been described in the embodiment, the configuration is not limited to a sector form, as a matter of course.

As described above, according to the inventions as described in the aforementioned first and fourth aspects, flat optical frequency characteristics are realized by defining a waveguide part of the second channel waveguide connected to an output side of the second slab waveguide in the arrayed waveguide grating into a parabolic configuration. In addition, since the parabolic configuration corresponds to the waveguide part of the second channel waveguide connected to the output side of the second slab waveguide in the arrayed waveguide grating, it is possible that these parabolic configurations have been adjusted in response to corresponding wavelengths, whereby there is such an excellent advantage that the inventions can cope with a trend of broad band in optical signals.

Furthermore, according to the inventions as described in the aforementioned second and fifth aspects, flat optical frequency characteristics are realized by defining a waveguide part of the second channel waveguide connected to an output side of the second slab waveguide in the arrayed waveguide grating into a configuration of a multi-mode interference in which a width of optical waveguide changes step-functionally and discontinuously. In addition, since the configuration as a multi-mode interference corresponds to the waveguide part of the second channel waveguide connected to the output side of the second slab waveguide in the arrayed waveguide grating, it is possible that these configurations as the multi-mode interference have been adjusted in response to corresponding wavelengths, whereby there is such an excellent advantage that the inventions can cope with a trend of broad band in optical signals.

Furthermore, according to the inventions as described in the aforementioned third, sixth, and seventh aspects, flat optical frequency characteristics are realized by defining a waveguide part of the second channel waveguide connected to an output side of the second slab waveguide in the arrayed waveguide grating into a rectangular field distribution exciting configuration that excites a rectangular field distribution. In addition, since the rectangular field distribution exciting configuration that excites the rectangular field distribution corresponds to the waveguide part of the second channel waveguide connected to the output side of the second slab waveguide in the arrayed waveguide grating, it is possible that these rectangular field distribution exciting configurations have been adjusted in response to corresponding wavelengths, whereby there is such an excellent advantage that the inventions can cope with a trend of broad band in optical signals.

Moreover, according to the invention as described in the aforementioned eighth aspect, flat optical frequency characteristics are realized by defining a waveguide part of the second channel waveguide connected to an output side of the second slab waveguide in the respective arrayed waveguide gratings constituting a line-like communication system into a rectangular field distribution exciting configuration that excites a rectangular field distribution wherein the above-described line-like communication system is composed of an optical transmission means for delivering optical signals having respective wavelengths in parallel; a multiplexer composed of arrayed waveguide gratings for subjecting the optical signals having the respective wavelengths delivered from the optical transmission means to wavelength division multiplexing; an optical transmission line for transmitting the optical signals which have been wavelength division-multiplexed and output from the multiplexer, nodes each provided with an arrayed waveguide grating disposed properly in the middle of the optical transmission line; a demultiplexer composed of an arrayed waveguide gratings to which optical signals delivered through the nodes disposed on the optical transmission line are input to separate into each of optical signals having respective wavelengths; and an optical receiver for receiving optical signals having the respective wavelengths separated by the demultiplexer. In addition, since the rectangular field distribution exciting configuration that excites the rectangular field distribution corresponds to the waveguide part of the second channel waveguide connected to the output side of the second slab waveguide in the arrayed waveguide grating, it is possible that these rectangular field distribution exciting configurations have been adjusted in response to corresponding wavelengths, whereby there is such an excellent advantage that the inventions can cope with a trend of broad band in optical signals.

Besides, according to the invention as described in the aforementioned ninth aspect, flat optical frequency characteristics are realized by defining a waveguide part of the second channel waveguide connected to an output side of the second slab waveguide in the respective arrayed waveguide gratings constituting a circular communication system into a rectangular field distribution exciting configuration that excites a rectangular field distribution wherein the above-described circular communication system is composed of an arrayed waveguide grating having a circular transmission line prepared by connecting circularly a plurality of nodes by the use of transmission lines and transmitting optical signals which have been wavelength division-multiplexed to these transmission lines, and separating the wavelength division-multiplexed optical signals into optical signals having respective wavelengths; and an arrayed waveguide grating for wavelength division-multiplexing optical signals, which have been separated into those having respective wavelengths. In addition, since the rectangular field distribution exciting configuration that excites the rectangular field distribution corresponds to the waveguide part of the second channel waveguide connected to the output side of the second slab waveguide in the arrayed waveguide grating, it is possible that these rectangular field distribution exciting configurations have been adjusted in response to corresponding wavelengths, whereby there is such an excellent advantage that the inventions can cope with a trend of broad band in optical signals.

It will be appreciated by those of ordinary skill in the art that the present invention can be embodied in other specific forms without departing from the spirit or essential characteristics thereof.

The presently disclosed embodiments are therefore considered in all respects to be illustrative and not restrictive. The scope of the invention is indicated by the appended claims rather than the foregoing description, and all changes that come within the meaning and range of equivalents thereof are intended to be embraced therein.

What is claimed is:

1. An arrayed waveguide grating, comprising:
   a substrate;
   a first channel waveguide disposed on the substrate for receiving a multiplexed optical signal;
   a channel waveguide array disposed on said substrate and constituted such that each length of waveguides is sequentially longer with a predetermined difference between the lengths of the waveguides;
   a first slab waveguide disposed on said substrate and connecting said first channel waveguide with said channel waveguide array;
   a second slab waveguide disposed on said substrate and connecting an end of said channel waveguide array on the side wherein said first slab waveguide has not been connected thereto with an end thereof; and
   a second channel waveguide disposed on said substrate and connected to the other end of said second slab waveguide, wherein a waveguide part in the connected area has a parabolic configuration.

2. An arrayed waveguide grating as claimed in claim 1, wherein a design of said waveguide part parabolic configuration is individually adjusted in response to respective wavelengths of multiplexed optical signals input to said first channel waveguide.

3. The arrayed waveguide grating of claim 1, wherein said channel waveguide array is formed as a parabolic configuration.

4. The arrayed waveguide grating of claim 1, wherein a width W(z) of the waveguide part having the parabolic configuration, at a location z on a Z axis, is equal to $$W(z)=\{2\alpha\lambda/n_{eff}(L-z)+Wc^2\}^{1/2}$$

wherein $\alpha$ is a parabolic coefficient, $\lambda$ is an optical wavelength of an optical transmission signal, $n_{eff}$ is an effective index, Wc is a core width of the second channel optical waveguide, and L is a length of the waveguide part having the parabolic configuration alone the Z axis.

5. The arrayed waveguide of claim 4, wherein the core width Wp of each said parabolic waveguide part is formed to have a different width, as appropriate for different wavelengths $\lambda_1$ of multiplexed optical signals input to said first channel waveguide.

6. The arrayed waveguide grating of claim 4, wherein $\alpha$ is approximately 1.1.

7. The arrayed waveguide grating of claim 1, wherein the waveguide part has a core width measuring from approximately one to five times a width of a Gaussian distribution produced in a boundary between the second slab waveguide and the second channel waveguide.

8. The arrayed waveguide grating of claim 1, wherein said parabolic waveguide part is adjusted to compensate for varying optical transmission widths and insertion loss of said optical transmissions.

9. A method for fabricating, said method comprising:
   forming an input channel waveguide on a substrate to serve as an input signal waveguide for a multiplexed optical signal having optical signals at wavelengths $\lambda_1$ through $\lambda_N$;
   forming an output channel waveguide on said substrate to serve as an output signal waveguide for separated optical signals of said multiplexed optical signal;
   forming a channel waveguide array on the substrate, wherein each length of the waveguides in the array is sequentially longer;
   connecting, with a first slab waveguide, said input channel waveguide to a first end of said channel waveguide array; and
   connecting, with a second slab waveguide, a second end of said channel waveguide array to said output channel waveguide, wherein an end of each waveguide of said output channel waveguide that connects to said second slab waveguide is formed in a parabolic shape.

10. The method of claim 9, wherein said channel waveguide array comprises an array with a predetermined difference in the lengths of the waveguides and said waveguides have a parabolic-shaped routing.

11. The method of claim 9, wherein said parabolic waveguide part is formed as an element designed to a specific signal wavelength.

12. The method of claim 9, wherein forming said parabolic waveguide part comprises forming a parabolic width W(z), at location z along a Z axis, that equals $$W(z)=\{2\alpha\lambda/n_{eff}(L-z)+Wc^2\}^{1/2}$$

wherein $\alpha$ is the parabolic coefficient, $\lambda$ is the optical wavelength of the optical transmission, $n_{eff}$ is an effective index, Wc is a core width of said second channel waveguide, and L is a length of the waveguide part having the parabolic configuration along the Z axis.

13. The method of claim 12, wherein an opening width of said waveguide part with said parabolic configuration is from approximately one to five times a width of a Gaussian distribution produced in a boundary between the second slab waveguide and the output channel waveguide, said width allowing an amount of light coupled to said second channel waveguide to remain substantially constant regardless of a light frequency change condition.

14. The method of claim 12, wherein $\alpha$ is approximately 1.1.

15. The method of claim 9, further comprising:
   adjusting the waveguide part to compensate for varying optical transmission widths and insertion loss of the optical transmissions.

16. The method of claim 9, wherein a core opening width of each waveguide comprising said second channel waveguide is common with varying wavelengths of multiplexed optical signals input to said first channel waveguide and a width of an opening of said parabolic waveguide part is preset in accordance to a specific wavelength.

17. An arrayed waveguide grating, comprising:
a substrate;
an input channel waveguide disposed on the substrate for receiving a multiplexed optical signal having optical signals at wavelengths $\lambda_1$ through $\lambda_N$;
a channel waveguide array disposed on said substrate and comprising a plurality of waveguides of differing lengths;
an output channel waveguide comprising a plurality of optical waveguides for outputting said received multiplexed optical signal as a plurality of separated optical signals at said wavelengths $\lambda_1$ through $\lambda_N$;
a first sector form slab waveguide disposed on said substrate and connecting said input channel waveguide with said channel waveguide array;
a second sector form slab waveguide disposed on said substrate and connecting said channel waveguide array with said output channel waveguide,
wherein a waveguide part of each optical waveguide of said output channel waveguide that is connected to said second sector form slab waveguide is shaped in a parabolic configuration.

18. The arrayed waveguide grating of claim 17, wherein said channel waveguide array is formed such that each length of said waveguides is sequentially longer.

19. The arrayed waveguide grating of claim 17, wherein a design of said parabolic configuration of each said waveguide part is preadjusted according to a wavelength.

20. The arrayed waveguide grating of claim 17, wherein said waveguide part parabolic configuration is individually preadjusted according to respective wavelengths of multiplexed optical signals input to said first channel waveguide.

21. The arrayed waveguide grating of claim 17, wherein:
a waveguide part of said input channel waveguide that connects to said first sector form slab waveguide is shaped in a tapered configuration;
a waveguide part of each waveguide in said channel waveguide array that connects to said first sector form slab waveguide is shaped in a tapered configuration; and
a waveguide part of each waveguide in said channel waveguide array that connects to said second sector form slab waveguide is shaped in a tapered configuration.

22. A multiplexer/demultiplexer apparatus comprising:
a sector form slab waveguide receiving, via a plurality of input ports, a plurality of optical signals separated from a multiplexed optical signal; and
an output channel waveguide comprising a plurality of output optical waveguides for outputting said plurality of separated optical signals, each said output optical waveguide attached to said sector form slab waveguide as an output port by a waveguide portion configured in a parabolic shape.

23. The apparatus of claim 22, wherein said waveguide portion configured in a parabolic shape has a core width measuring from approximately one to five times a width of a Gaussian distribution produced in a boundary between said sector form slab waveguide and said output channel waveguide, thereby allowing an amount of light coupled to said output channel waveguide to remain substantially constant regardless of a light frequency change condition.

* * * * *